US010985429B2

(12) United States Patent
Takase et al.

(10) Patent No.: US 10,985,429 B2
(45) Date of Patent: Apr. 20, 2021

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-ken (JP)

(72) Inventors: Shinichi Takase, Mie (JP); Yasuhiko Kotera, Mie (JP); Yusuke Suzuki, Aichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 120 days.

(21) Appl. No.: 16/338,606

(22) PCT Filed: Sep. 15, 2017

(86) PCT No.: PCT/JP2017/033467
§ 371 (c)(1),
(2) Date: Apr. 1, 2019

(87) PCT Pub. No.: WO2018/066343
PCT Pub. Date: Apr. 12, 2018

(65) Prior Publication Data
US 2020/0044223 A1 Feb. 6, 2020

(30) Foreign Application Priority Data
Oct. 3, 2016 (JP) .............................. JP2016-195416

(51) Int. Cl.
H01M 50/502 (2021.01)
H01M 50/20 (2021.01)

(52) U.S. Cl.
CPC ......... H01M 50/502 (2021.01); H01M 50/20 (2021.01)

(58) Field of Classification Search
CPC .................................................. H01M 50/502
See application file for complete search history.

(56) References Cited

U.S. PATENT DOCUMENTS

| 10,886,519 B2 * | 1/2021 | Sato ..................... H01M 10/482 |
| 2014/0212732 A1 | 7/2014 | Ichikawa et al. |
| 2014/0370343 A1 * | 12/2014 | Nomoto .............. H01M 2/1077 |
| | | 429/90 |
| 2016/0380252 A1 * | 12/2016 | Rhein ................... H01M 2/043 |
| | | 429/90 |
| 2018/0198110 A1 * | 7/2018 | Zeng ....................... H02H 3/08 |

FOREIGN PATENT DOCUMENTS

| JP | 2012-164437 A | 8/2012 |
| JP | 2013-45508 A | 3/2013 |
| JP | 2013-105571 A | 5/2013 |
| JP | 2013-143281 A | 7/2013 |
| JP | 2014-022287 | 2/2014 |
| JP | 2014-146543 A | 8/2014 |
| JP | 2015-22965 A | 2/2015 |
| JP | 2016-18741 A | 2/2016 |
| JP | 2017-4803 A | 1/2017 |
| JP | 2018-55843 A | 4/2018 |

OTHER PUBLICATIONS

International Search Report issued in International Appl. No. PCT/JP2017/033467, dated Oct. 10, 2017.

* cited by examiner

Primary Examiner — Ladan Mohaddes
(74) Attorney, Agent, or Firm — Greenblum & Bernstein, P.L.C.

(57) ABSTRACT

A connection module includes: an insulating protector that holds a plurality of bus bars to connect between electrode terminals; and a flexible printed circuit that is held by the insulating protector, and includes a detection line that is connected to the each of the bus bars and detects a state of the power storage element. The insulating protector includes a protector horizontal part including a holding part which holds each of the bus bars and is formed at one end; and a vertical part that is extended in a vertical direction from the protector horizontal part in at least a part of another end, opposite to the one end, of the protector horizontal part. The flexible printed circuit includes: a substrate horizontal part that is held by the protector horizontal part; and a bent part that is bent perpendicularly to the substrate horizontal part and held by the vertical part.

9 Claims, 10 Drawing Sheets

CONNECTION MODULE

TECHNICAL FIELD

The present invention relates to a connection module, and specifically to a connection module that is used for a power storage module.

BACKGROUND ART

One of the conventional connection modules to be attached to an upper surface of a power storage element group including a plurality of power storage elements including electrode terminals of a positive electrode and a negative electrode is disclosed in Patent Document 1. This type of connection module is attached to a power storage element group that is mounted in a vehicle such as an electric vehicle or a hybrid vehicle.

The connection module (battery wiring module) according to Patent Document 1 includes: a plurality of bus ban connecting between electrode terminals; flexible printed circuit including a plurality of conductive paths (detection lines) for detecting a state of the power storage elements; and an insulating protector that holds the plurality of bus bars and the flexible printed circuit. By providing a reinforcement plate to the flexible printed circuit, electronic components of an electric circuit configured to process information regarding the power storage elements can be mounted on the flexible printed circuit.

RELATED ART DOCUMENT

Patent Document

Patent Document 1: Japanese Unexamined Patent Application Publication No. 2013-45508

DISCLOSURE OF THE PRESENT INVENTION

Problem to be Solved by the Invention

The conventional connection module described above can be further reduced in size by having the electronic components mounted on the flexible printed circuit. However, as the power storage element group is increased in voltage, for example, the power storage element group includes mote power storage elements and more detection lines are provided. In this case, the flexible printed circuit also has a larger area. An upper surface of the power storage element group may include an exhaust duct or the like, and in this case, the occupied area by the connection module on the upper surface of the power storage element group is limited. In view of this, a connection module that can deal with the increase in number of power storage elements and occupies a smaller area on the upper surface of the power storage element group has been desired.

In view of the above, in the present description, an object is to provide a connection module that can deal with the increase in number of power storage elements and occupies a smaller area the upper surface of the power storage element group.

Means for Solving the Problem

A connection module disclosed herein is a connection module to be attached to a power storage element group including a plurality of power storage elements including electrode terminals of a positive electrode and a negative electrode, and to connect the electrode terminals. The connection module includes: an insulating protector that holds a plurality of bus bars to connect between the electrode terminals; and a flexible printed circuit that is held by the insulating protector, and includes a detection line that is connected to each of the bus bars and detects a state of the power storage elements. The insulating projector includes: a protector horizontal part including a holding part which holds each of the bus bars and is formed at one end; and a vertical part that is extended in a vertical direction from the protector horizontal pare in at least a part of another end, opposite to the one end, of the protector horizontal part. The flexible printed circuit includes: a substrate horizontal part that is held by the protector horizontal part; and a bent part that is bent perpendicularly to the substrate horizontal part and held by the vertical part.

In the present configuration, the insulating protector includes the vertical part that is extended in the vertical direction from the protector horizontal part in at least a part of the other end of the protector horizontal part. The flexible printed circuit including the detection line that detects the state of the power storage element includes the substrate horizontal part and the bent part that is held by the vertical part of the insulating protector. Therefore, by the bent part, the occupied area on the power storage element group can be reduced without reducing the wiring area of the flexible printed circuit. In addition, by changing the area of the bent part in accordance with the number of power storage elements, it is possible to deal with the increase in number of power storage elements. That is to say, by the present configuration, it is possible to deal with the increase in number of power storage elements and additionally, the occupied area of the connection module on the upper surface of the power storage element group can be reduced.

In the above connection module, the insulating protector may include a plurality of unit protectors each provided to the corresponding one of the bus bars; the flexible printed circuit may include a plurality of unit substrates each provided to the corresponding one of the unit protectors. At a position corresponding to a gap between two of the bus bars that are adjacent, a protector extra length part chat is longer than the gap and couples two of the protector horizontal parts that are adjacent may be formed between the protector horizontal parts of two of the unit protectors that are adjacent, a horizontal extra length part that is longer than the gap and couples two of the substrate horizontal parts that are adjacent may be formed between the substrate horizontal parts of two of the unit substrates that are adjacent, and a vertical extra length part that is longer than the gap and couples the two bent parts that are adjacent may be formed between bent parts of the two unit substrates that are adjacent.

By the above configuration, the pitch tolerance between the electrode terminals can be absorbed by each coupling part.

The above connection module may further include an opening formed between the horizontal extra length part and the vertical extra length part.

In the above configuration, by setting the size of the opening as appropriate, the plurality of unit substrates, the horizontal extra length parts, and the vertical extra length parts can be formed suitably from one flexible printed circuit.

In the above connection module, the insulating protector may include: a first protector that is attached to one end part of an upper surface of the plurality of power storage elements in a direction perpendicular to a direction where the plurality of power storage elements are arranged; and a second protector that is attached to another end part, opposite to the one end part, of the upper surface of the plurality of power storage elements. The flexible printed circuit may include: a first substrate that is held by the first protector; a second substrate that is held by the second protector; and a substrate connection part that electrically connects the first substrate and the second substrate. The first protector and the second protector may include, at one end part, a placement part that unifies the first protector and the second protector and that has the substrate connection part placed thereon. The first protector and the second protector may include, at another end part, a linking part that links the first protector and the second protector.

The present configuration is applicable to the power storage element group including two electrode lines, and in addition, since the first protector and the second protector are linked by the linking part, the connection module can be handled more easily when the connection module is attached to the power storage element group. Thus, the work of attaching the connection module is made efficient.

In the above connection module, at least one of the first substrate and the second substrate may be provided with an electronic component configured to process information regarding the power storage elements taken in through the bus bars.

In the above configuration, the flexible printed circuit, on which the electronic components are mounted, leaves therein smaller space for the detection lines. However, by wiring the detection line in the bent part, the small wiring space can be compensated without increasing the planar area on the flexible printed circuit. Therefore, in the present configuration in which the electronic component is mounted on the flexible printed circuit, the bent part can be used more effectively.

Advantageous Effect of the Invention

The connection module according to the present invention can deal with the increase in number of power storage elements and occupies a smaller area on the upper surface of the power storage element group.

MODE FOR CARRYING OUT THE INVENTION

Embodiment

Figure 1:
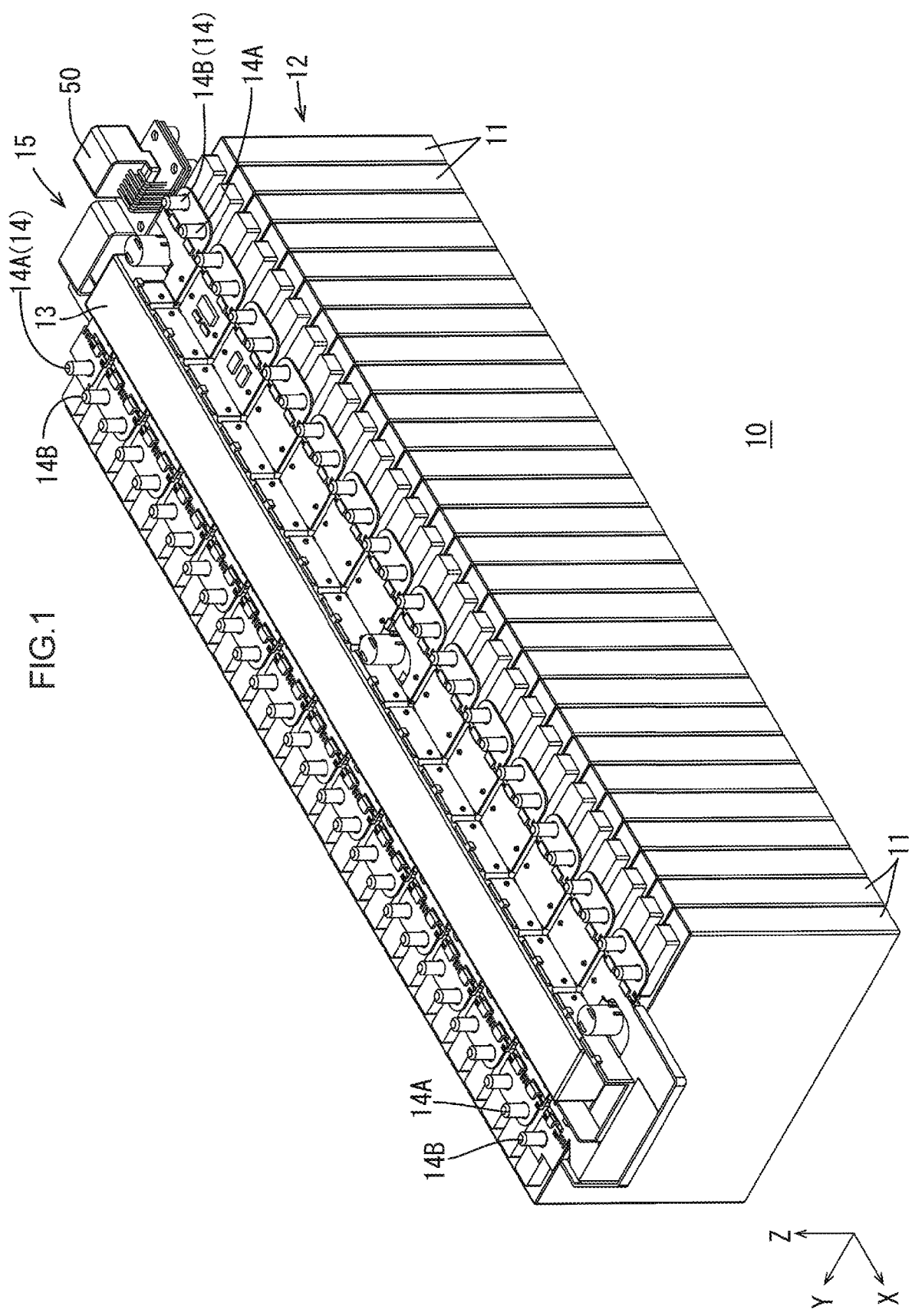
FIG. 1 is a perspective view illustrating a power storage module including a connection module according to one embodiment.

One embodiment is described with reference to FIG. 1 to FIG. 10. A power storage module 10 according to the present embodiment is used as, for example, a driving source of an electric vehicle, a hybrid vehicle, or the like. As illustrated in FIG. 1, the power storage module 10 includes a power storage element group 12 in which a plurality of (twenty-eight in the present embodiment) power storage elements 11 are arranged in line, and a connection module 15 to be attached to the power storage element group 12 to connect the plurality of power storage elements 11. At an upper central part of the power storage element group 12, an exhaust duct 13 is provided. Note that, in FIG. 1, a direction indicated by an arrow X is a left direction in the power storage module 10, a direction indicated by an arrow Y is a direction to the rear, and a direction indicated by an arrow Z is an upward direction.

1. Power Storage Element, Group

As illustrated in FIG. 1, the power storage element 12 has a flat, substantially rectangular parallelepiped shape, and houses a power generating element that is not shown. On an upper surface of the power storage element 11, a pair of electrode terminals 14 is formed to project upward at positions near ends in a front-back direction. One of the pair of electrode terminals 14 is a positive electrode terminal 14A and the other is a negative electrode terminal 14S. The electrode terminal 14 is formed to have a shape of a male screw. The power storage elements 11 that are adjacent have opposite polarities, and thus, the positive electrode terminal 14 and the negative electrode terminal 14 are adjacent to each other. Two electrode lines formed in this manner are arranged in the front-back direction with the duct 13 interposed therebetween on the upper surface of the power storage element group 12. The electrode terminals 14 are fastened with nuts (not shown) with a bus bar 10 interposed therebetween. The bus bar 40 is held by the connection module 15. The plurality of power storage elements 11 are fixed by a known fixing means such as a holding plate, though not shown in detail.

2. Configuration of Connection Module

As illustrated in FIG. 1, the connection module 15 that is long and thin along a direction were the power storage elements 11 are arranged (arrow-X direction) is disposed on the upper surface of the power storage element group 12.

Figure 2:
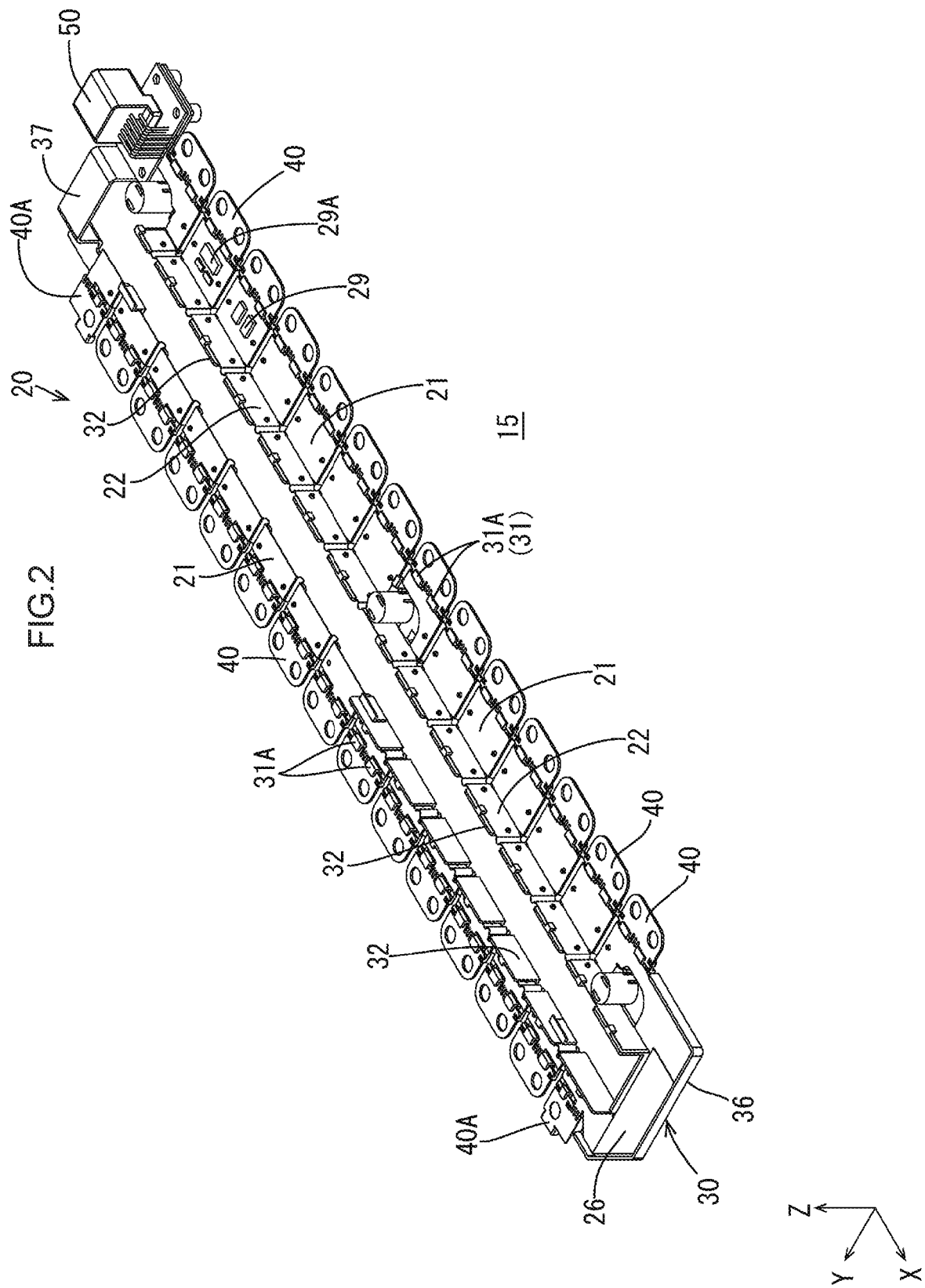
FIG. 2 is a perspective view illustrating the connection module according to one embodiment.
Figure 3:
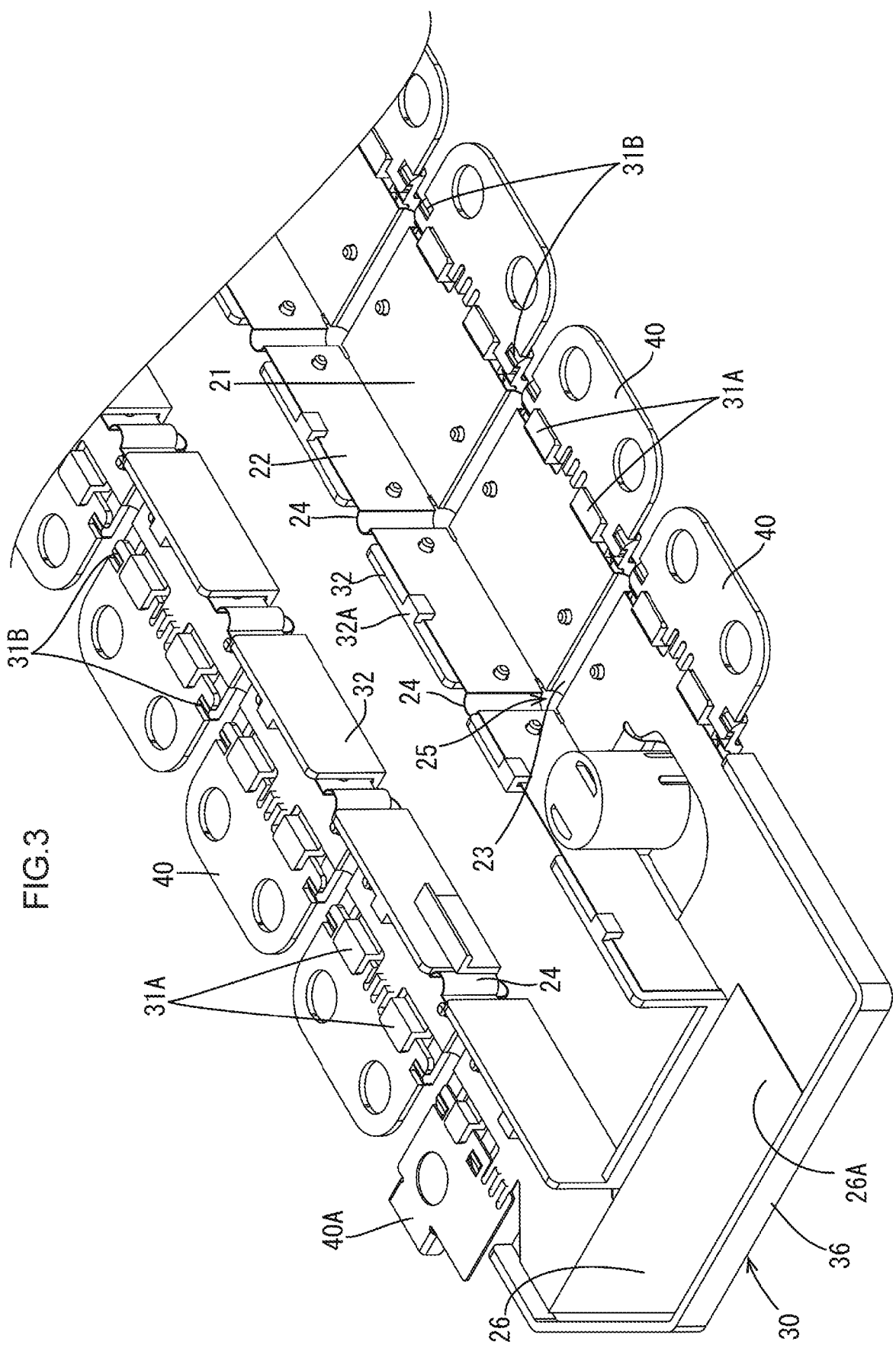
FIG. 3 is a partial magnified view of FIG. 2.
Figure 4:
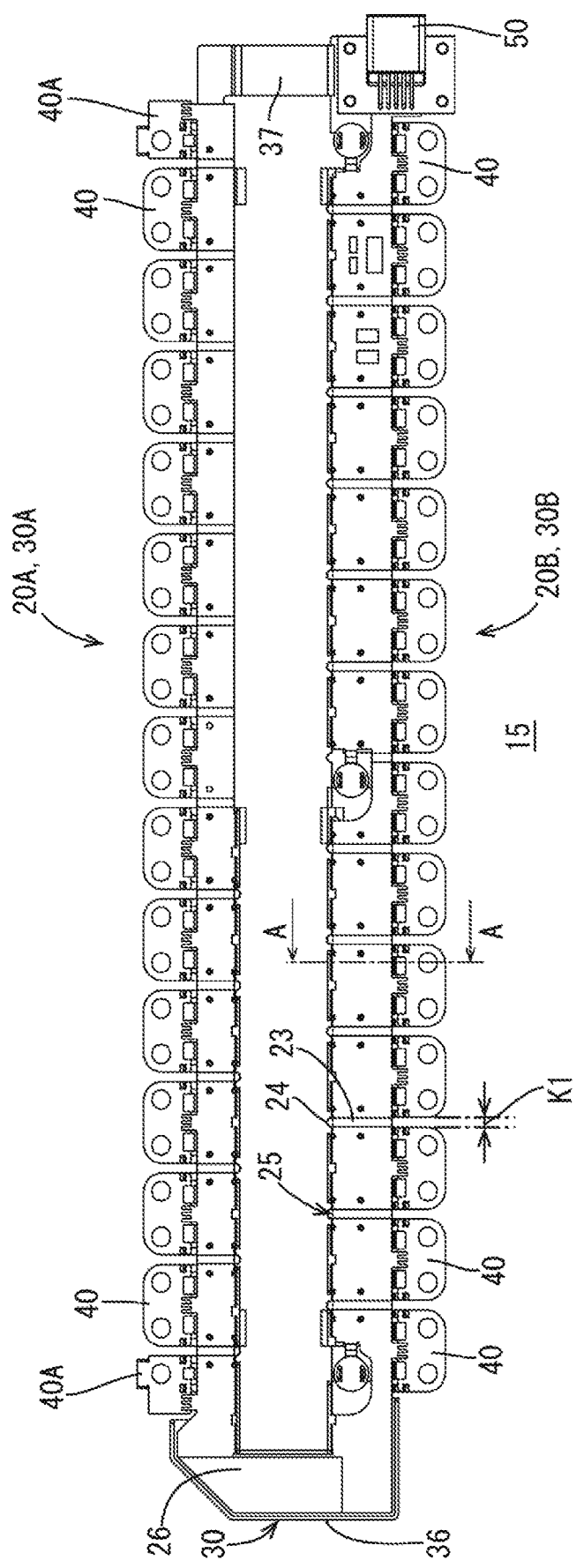
FIG. 4 is a plan view of the connection module.
Figure 5:
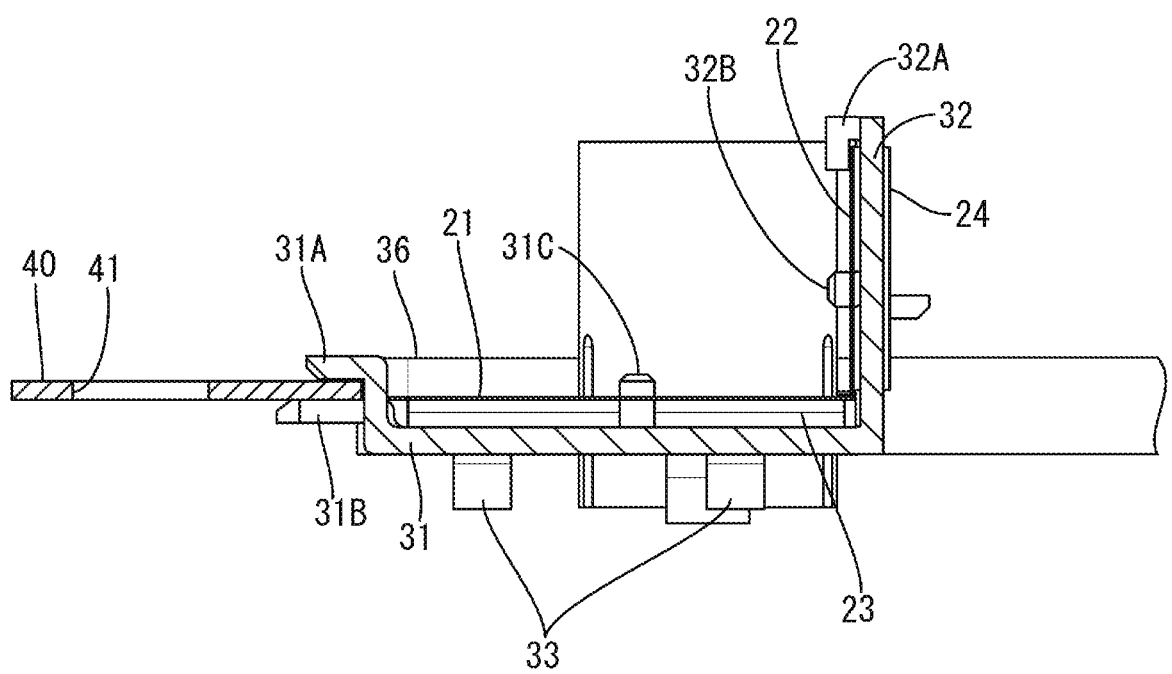
FIG. 5 is a cross-sectional view taken along line A-A in FIG. 4.

As roughly illustrated in FIG. 2 and FIG. 3, the connection module 15 includes insulating protectors 30 that hold the plurality of bus bars 40 connecting between the electrode terminals 14, and a flexible printed circuit (hereinafter simply referred to as "FPC") 20 that is field by the insulating protectors 30 and has detection lines 28 (see FIG. 9) formed thereon. The detection line 28 is connected to the bus bar 40 to detect a state of the power storage element 11. The insulating protectors 30 are disposed in two lines that are parallel to each other in accordance with the two electrode lines (see FIG. 6) and the FPC 20 is formed to have a U-like shape (see FIG. C) as will be described below.

2-1. Insulating Protector

Figure 6:
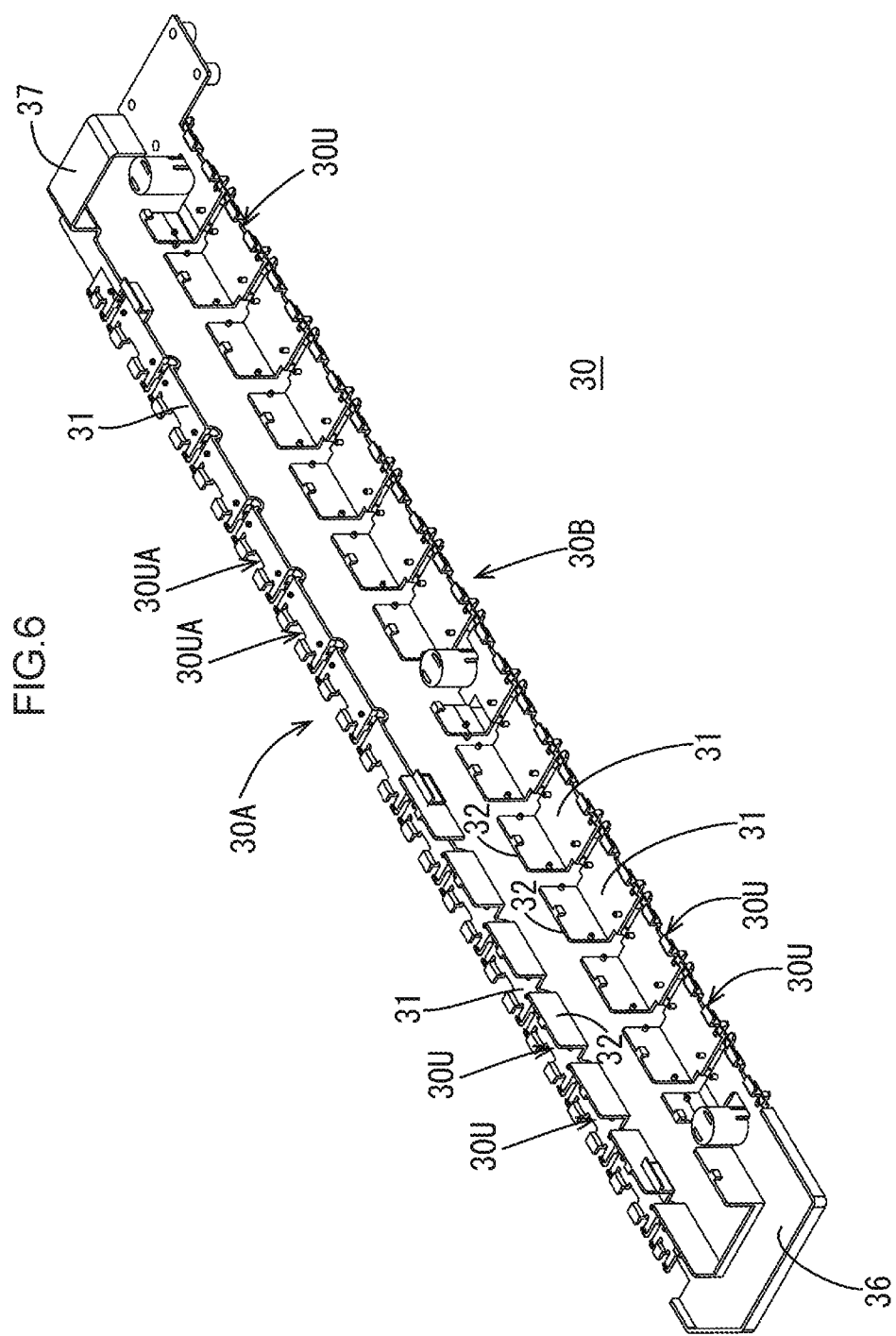
FIG. 6 is a perspective view illustrating an insulating protector.
Figure 7:
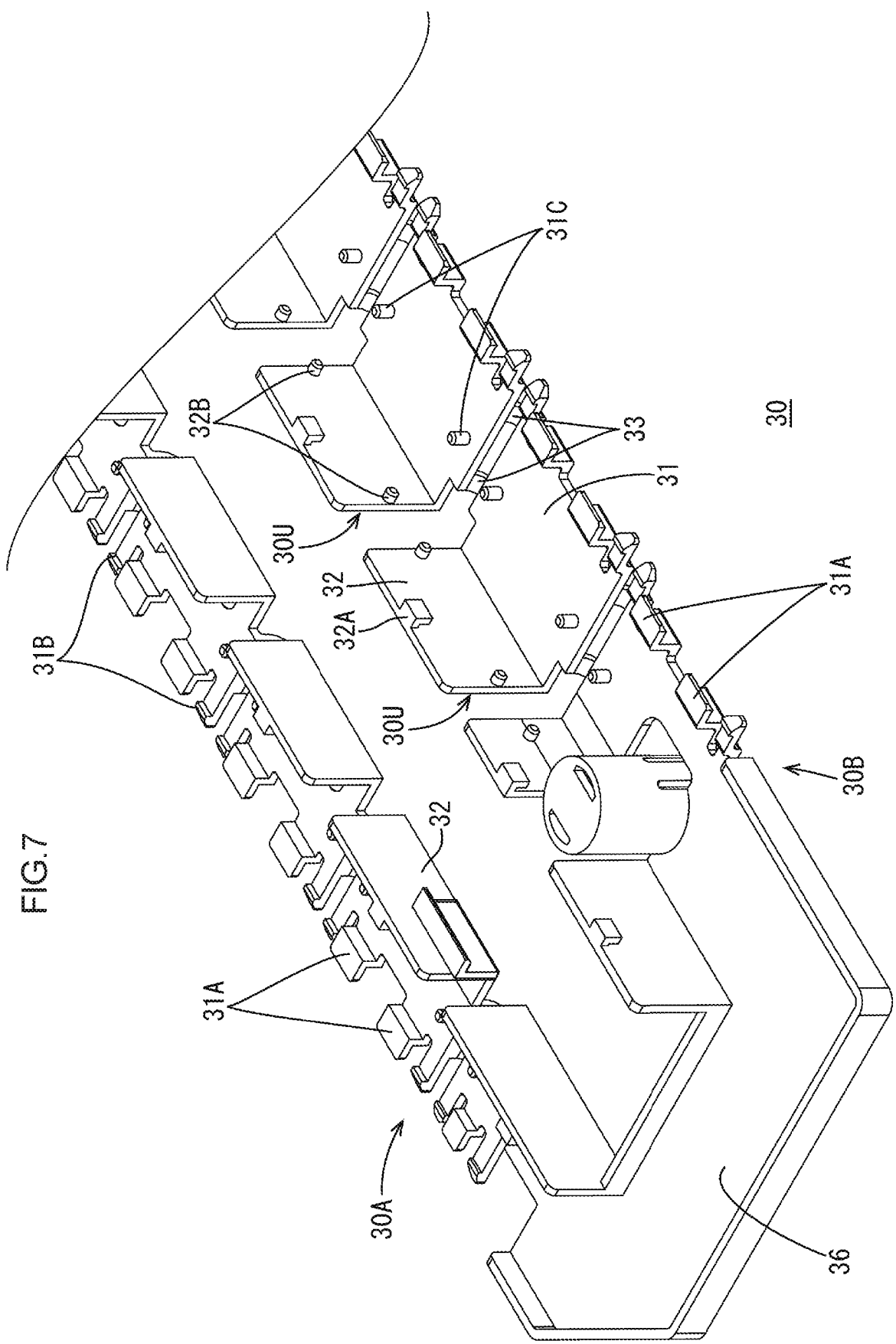
FIG. 7 is a partial magnified view of FIG. 6.

The insulating protector 30 is formed of synthetic resin and includes a plurality of unit protectors 30U each provided to the corresponding one of the bus bars 40 as illustrated in FIG. 6. As illustrated in FIG. 7, each unit protector 30U includes a protector horizontal part 31 in which holding parts (31A, 31B) that hold the bus bar 40 are formed on one end, and a vertical part 32 that is extended in a vertical direction from the protector horizontal part 31 at the other end which is opposite to the one end, of the protector horizontal part 31.

The holding parts of the bus bar 40 provided at a front one end part of the protector horizontal part 31 include a pair of clamping parts 31A and a pair of engaging claw parts 31B. The pair of engaging claw parts 31B is engaged with a pair of engaging grooves 43 provided to the bus bar 40 (in FIG. 10). The pair of clamping parts 31A clamps the bus bar 40 with the pair of engaging claw parts 31B. Thus, the bus oar 40 is held at the one end of the protector horizontal part 31 (see FIG. 5). In addition, the protector horizontal part 31 includes a pair of engaging columns 31C that penetrates through penetration holes 21B of the FPC 20 to engage with the FPC 20. The configuration of the holding parts is not limited to the pair of clamping pares 31A and the pair of engaging claw parts 31B.

Between the protector horizontal parts 31 of the two adjacent unit protectors 30U, a pair of protector extra length parts 33 is provided at front and rear ends between the protector horizontal parts 31 (see FIG. 5) as illustrated in FIG. 7. The protector extra length parts 33 couple the two protector horizontal parts 31. Each protector extra length part 33 is longer than a gap K1 between the two adjacent bus bars 40 (see FIG. 4) and is provided to form a curved part thereby. Since the curved part is deformed in accordance with a pitch tolerance between the electrode terminals, the pitch tolerance between the electrode terminals can be absorbed. The protector extra length part 33 is not limited to being formed as a pair but may be formed by one at a central position between the protector horizontal parts 31, for example.

The vertical part 32 of the unit protector 30U includes an engaging part 32A and a pair of engaging columns 32B for engaging with the FPC 20. Some of the unit protectors 30UA do not include the vertical part 32 as illustrated in FIG. 6.

In the present embodiment, as illustrated in FIG. 6, the insulating protector 30 includes a first protector 30A that is attached to one end part (in the present embodiment, rear end part) of the upper surface of the plurality of power storage elements 11 in a direction (arrow-Y direction in FIG. 1) perpendicular to the direction where the plurality of power storage elements 11 are arranged, and a second protector 30E that is attached to the other end part (in the present embodiment, front end) which is opposed to the one end, of the upper surface of the plurality of power storage elements 11.

As illustrated in FIG. 6, the first protector 30A includes a plurality of unit protectors 30U. Specifically, in the present embodiment, the first protector 30A includes seven unit protectors 30U and eight unit protectors 30UA. The second protector 30B includes a plurality of (fourteen in the present embodiment) unit protectors 30U.

As illustrated in FIG. 6, at one end part of the first protector 30A and the second protector 30B (in the present embodiment, left end), a placement part 36 is formed. The placement part 36 unifies the first protector and the second protector. On the placement part 36, a substrate connection part 26 (see FIG. 8), which will be described below, is placed. On the other hand, at the other end part, of the first protector and the second protector (in the present embodiment, right end), a linking part 37 to link the first protector 30A and the second protector 30B is formed.

2-2. FPC

Figure 8:
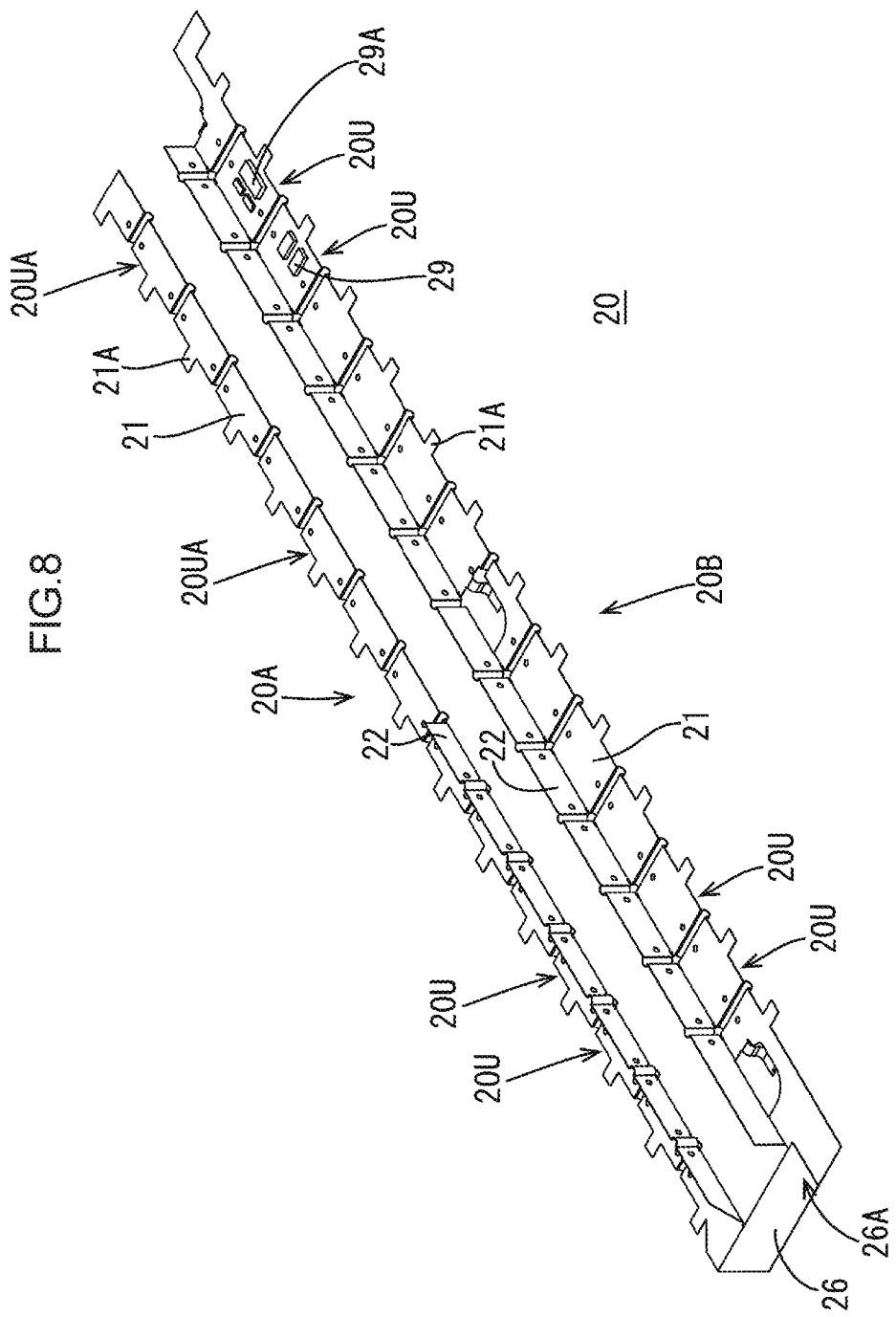
FIG. 8 is a perspective view illustrating an FPC.
Figure 9:
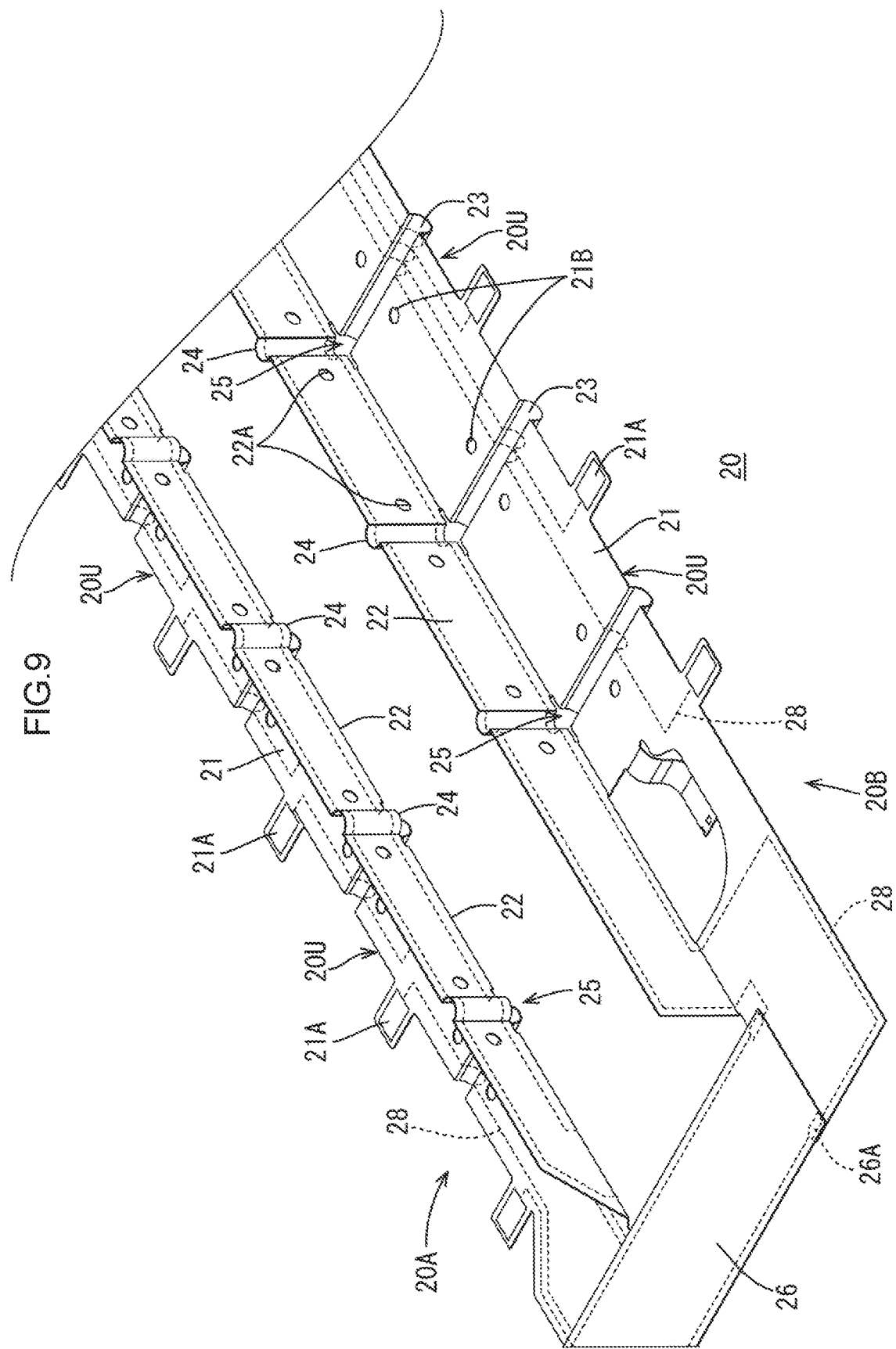
FIG. 9 is & partial magnified view of FIG. 8.

The FPC 20 includes an insulating base film formed by a polyimide film or the like, and the detection lines 28. The FPC 20 includes a plurality of unit substrates 20U, each being used for the corresponding one of the unit protectors 30U, as illustrated in FIG. 8. As illustrated in FIG. 9, the unit substrate 20U includes a substrate horizontal part 21 that is held by the protector horizontal part 31 of the insulating protector 30, and a bent part 22 that is bent perpendicularly to the substrate horizontal part 21 and held by the vertical part 32 of the insulating protector 30. In FIG. 9, only a part of the detection line 28 is shown by a dashed line.

As illustrated in FIG. 9, the substrate horizontal part 21 of the unit substrate 20U includes a connection lane 21A to be connected to a pair of detection terminals 42 (see FIG. 10) of the bus bar 40, and a pair of penetration holes 21B. The connection land 21A is connected to the detection line 28. On the other hand, the bent part 22 includes a pair of penetration holes 22A. Through the pair of penetration holes 22A, the pair of engaging columns 32B of the vertical part 32 of the unit protector 30U penetrates. Some of the unit substrates 20UA do not include the bent part 22 as illustrated in FIG. 8.

At a position corresponding to the gap K1 between the two adjacent bus bars 40 (see FIG. 4), a horizontal extra length part 23 is formed between the substrate horizontal parts 21 of the two adjacent unit substrates 20U and a vertical extra length part 24 is formed between the bent parts 22 of the two adjacent unit substrates 20U. As illustrated in FIG. 9, each of the extra length parts 23 and 24 is longer than the yap K1 between the two adjacent bus bars 40 and is provided to form a curved part thereby. Since the curved part is deformed in accordance with a pitch tolerance between the electrode terminals at the same time as the protector extra length part 33, the pitch tolerance between the electrode terminals can be absorbed.

Between the horizontal extra length part 23 and the vertical extra length part 24, an opening 25 is provided as illustrated in FIG. 9. By setting the size and shape of the opening 25 as appropriate, the plurality of unit substrates 20U, the horizontal extra length parts 23, and the vertical extra length parts 24 can be formed suitably from one flexible printed circuit 20. The opening 25 may be omitted. In this case, by the shape or the like of the horizontal extra length part 23 or the vertical extra length part 24, for example, the function of the opening 25, that is, the function of forming the plurality of unit substrates 20U including the substrate horizontal parts 21 and the bent parts 22, the horizontal extra length parts 23, and the vertical extra length parts 24 from one flexible printed circuit 20 can be achieved.

In the present embodiment, as illustrated in FIG. 8, the FPC 20 is formed by the first substrate 20A that is held by the first protector 30A, the second substrate 20B that is held by the second protector 30B, and the substrate connection part 26 that connects the first substrate 20A and the second substrate 20B.

As illustrated in FIG. 8, the first substrate 20A is formed by the plurality of unit substrates 20U. Specifically, in the present embodiment, the first substrate 20A is formed by seven unit substrates 20U and eight unit substrates 20UA. The second substrate 20B is formed by the plurality of (fourteen in the present embodiment) unit substrates 20U.

The reason why the unit substrates 20UA are used in a part of the first substrate 20A is because fewer detection lines 28 are required at the position where the unit substrates 20UA are used, and therefore the bent part 22 for wiring the detection line 28 is not required. Alternatively, the first substrate 20A may be formed entirely by the unit substrates 20U, or entirely by the unit substrates 20UA. The unit substrates 20UA may be used in a part of the second substrate 20B similarly. The unit protector 30UA is used in accordance with the unit substrate 20UA.

In the present embodiment, the substrate connection part 26 is integrated with the first substrate 20A. A connection terminal part 26A of the detection line 28 formed at the end of the substrate connection part 26 is connected to the second substrate 20B by solder, for example, and this connection causes the first substrate 20A and the second substrate 20B to be electrically connected.

In the present embodiment, moreover, the second substrate 20B is a double-sided substrate. As illustrated in FIG. 8, for example, on a front surface side of the second substrate 20B, electronic components (29, 29A) configured to process information regarding the power storage elements 11 taken in through the bus bars 40, such as the voltage of the power storage elements 11, are mounted. Examples of the electronic component 29 include a resistor, a capacitor, and a thermistor, and examples of the electronic component 29A include a control element such as a CPU.

2-3. Bus Bar

Figure 10:
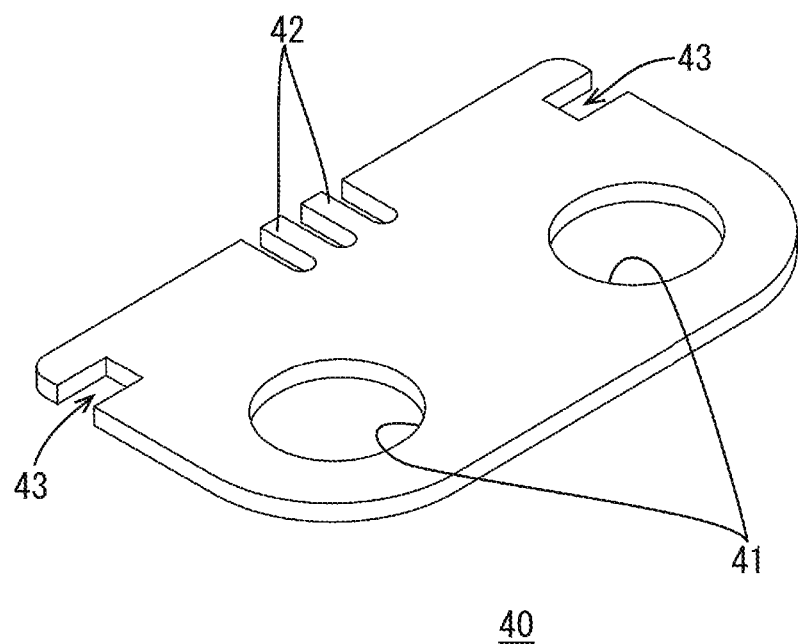
FIG. 10 is a perspective view illustrating a bus bar.

The bus bar 40 is formed of metal such as copper, copper alloy, stainless steel (SUS), or aluminum. The bus bar 40 includes a pair of terminal insertion holes 41 through which the electrode terminals 14 are inserted. The terminal insertion holes 41 are formed so as to have a space therebetween in accordance with the distance between the adjacent electrode terminals 14 (electrode pitch) as illustrated in FIG. 10. An external connection electrode bus bar 40A includes only one terminal insertion hole 41 (see FIG. 2 and FIG. 3). The terminal insertion hole 41 has an oval shape that is long in the direction where the power storage elements 11 are arranged (arrow-X direction in FIG. 1).

At both ends of the bus bar 40 in the direction where the power storage elements 11 are arranged, that is, the direction where the bus bars 40 are arranged (arrow-X direction in FIG. 1), the pair of engaging grooves 43 is formed as illustrated in FIG. 10. The engaging grooves 43 are used to hold the bus bars 40 in the protector horizontal parts 31. As described above, the pair of engaging grooves 43 is engaged with the pair of engaging claw parts 31B of the protector horizontal part 31, so that the bus bars 40 are held by the protector horizontal parts 31.

In addition, the bus bar 40 includes the pair of detection terminals 42 for detecting the voltage of the power storage elements 11 as illustrated in FIG. 10. The pair of detection terminals 42 is connected to the connection land 21A of the substrate horizontal part 21 by, for example, solder as described above.

3. Assembling Procedure

A procedure of assembling the power storage module 10 according to the present embodiment is described.

As illustrated in FIG. 1, 28 power storage elements 11 are arranged in an overlapped manner such that the adjacent power storage elements 11 have opposite polarities; thus, the power storage element group 12 is formed.

On the other hand, as illustrated in FIG. 8, the first substrate 20A and the second substrate 20B are connected through the substrate connection part 26; thus, the FPC 20 with a U-like shape is formed. On the surface of the second substrate 20B, the electronic component 29 including the CPU 25A is mounted by reflow soldering. In addition, a connector part 50 is also attached to the second substrate 20B.

Next, the FPC 20 is attached onto the insulating protector 30 illustrated in FIG. 6. Then, the bus bar 40 is held by the holding parts 31A and 31B of the protector horizontal part 31 of the insulating protector 30. Next, the detection terminal 42 of the bus bar 40 is soldered to the connection land 21A of each substrate horizontal part 21 of the FPC 20. Thus, the connection module 15 as illustrated in FIG. 2 is formed.

The connection module 15 formed as above is placed at a predetermined position on the upper surface of the power storage element group 12 as illustrated in FIG. 1. That is to say, the connection module 15 is placed at a predetermined position on the upper surface of the power storage element group 12 so as to surround the exhaust duct 13 provided at the central part of the upper surface of the power storage element group 12. In this placement, the electrode terminal 14 of the corresponding power storage element 11 is inserted into the terminal insertion hole 41 of the bus bar 40 and a nut (not shown) is screwed with each electrode terminal 14 and fastened. Thus, the electrode terminal 14 and the bus bar 40 are connected. Therefore, the power storage module 10 is formed. In this case, the protector horizontal parts 31 of the unit protectors 30U and the extra length parts 33, 23, and 24 provided to the unit substrates 20U deform to change the space between the adjacent protector horizontal parts 31. By this change, the pitch tolerance between the electrode terminals 14 generated between the two adjacent power storage elements 11 can be absorbed. The above assembling procedure is just one example, and the procedure is not limited to this example.

4. Effect of the Present Embodiment

The insulating protector 30 includes the vertical part 32 that is extended in a vertical direction from the protector horizontal part 31 in at least a part of the protector horizontal part 31 on the other end. In addition, the flexible printed circuit 20 including the detection line for detecting the state of the power storage element 11 includes, in addition to the substrate horizontal part 21, the bent part 22 that is held by the vertical part 32 of the insulating protector. Therefore, by the bent part 22, the occupied area on the power storage element group 12 can be reduced without reducing the wiring area of the flexible printed circuit 20. Therefore, it is possible to handle the power storage element group 12 in which the exhaust duct 13 or the like is provided at the central part of the upper surface of the power storage element group 12, and the apace for placing the connection module 15 is limited. By changing the area of the bent part 22 in accordance with the number of power storage elements it is possible to deal with the increase in number of power storage elements. That is to say, in the present embodiment, it is possible to deal with the increase in number of power storage elements and additionally, the occupied area of the connection module 15 on the upper surface of the power storage element group can be reduced.

The insulating protector 30 includes the plurality of unit protectors 30U for the buy bars 40, and the flexible printed circuit 20 includes the plurality of unit substrates 20U for the unit protectors 30U. The protector horizontal parts 31 of the two adjacent unit protectors 30U are coupled by the protector extra length part 33 that is longer than the gap K1. In addition, the substrate horizontal parts 21 of the two adjacent unit substrates 20U are coupled by the horizontal extra length part 23 that is longer than the gap K1, and the bent parts 22 of the two adjacent unit substrates 20U are coupled by the vertical extra length part 24 that is longer than the gap K1. Therefore, the extra length parts 23, 24, and 33 deform in the direction where the power storage elements 11 are arranged (arrow-X direction in FIG. 1) in accordance with the pitch tolerance between the electrode terminals, that is, the extra length parts 23, 24, and 33 deform such that the gap K1 between the two bus bars 40 is expanded or contracted; thus, the pitch tolerance between the electrode terminals can be absorbed.

The present invention is applicable to the power storage element group 12 including two electrode lines, and in addition, since the first protector 30A and the second protector 30B are linked by the linking part 37, the connection module 15 can be handled more easily when the connection module 15 is attached to the power storage element group 12. Thus, the work of attaching the connection module 15 is made efficient.

The flexible printed circuit 20, on which the electronic components 29 are mounted, leaves therein smaller space for the detection lines 28. However, by wiring the detection line 28 in the bent pact 22, the small wiring space can be compensated without increasing the planar area (occupied area) on the flexible printed circuit 20. Therefore, in the present embodiment in which the electronic component 29 is mounted on the flexible printed circuit 20, the bent part 22 can be used more effectively.

Other Embodiments

The present invention is not limited to the embodiment described above and with reference to the drawings. For example, the following embodiments may be included in the technical scope of the present invention.

(1) In the above embodiment, the insulating protector 30 includes the plurality of unit protectors 30U and the FPC 20 includes the plurality of unit substrates 20U; however, the configuration is not limited to this example. The insulating protector 30 may be an integrated insulating protector without the coupling part, and the FPC 20 may be an integrated FPC without the coupling part.

The insulating protector 30 includes the first protector 30A and the second protector 30B and the FPC 20 includes the first substrate 20A and the second substrate 20B; however, the configuration is not limited to this example. The insulating protector 30 may be formed by one insulating protector without the placement part and the linking part, and the FPC 20 may be one FPC without the connection part.

(2) In the above embodiment, the electronic components 29 and 29A are mounted on the second substrate 20B; however, the configuration is not limited to this example. That is to say, the FPC 20 may eliminate the electronic components 29 and 29A.

EXPLANATION OF SYMBOLS

11: Power storage element
12: Power storage element group
14: Electrode terminal
15: Connection module
20: FPC (Flexible printed circuit)
20A: First substrate
20B: Second substrate
20U: Unit substrate
21: Substrate horizontal part
22: Bent part
23: Horizontal extra length part
24: Vertical extra length part
25: Opening
26: Substrate connection part
29: Electronic component
29A: CPU (Electronic component)
30: Insulating protector
30A: First protector
30B: Second protector
30U: Unit protector
31A: Clamping pare (Holding part)
31B: Engaging claw part (Holding part)
33: Protector extra length part
36: Placement part
37: Linking part
40: Bus bar

The invention claimed is:

1. A connection module to be attached to a power storage element group including a plurality of power storage elements including electrode terminals of a positive electrode and a negative electrode, and to connect the electrode terminals, the connection module comprising:
    an insulating protector that holds a plurality of bus bars to connect between the electrode terminals; and
    a flexible printed circuit that is held by the insulating protector, and includes a detection line that is connected to each of the bus bars and detects a state of the power storage elements,
    the insulating protector including:
        a protector horizontal part including a holding part which holds each of the bus bars and is formed at one end; and
        a vertical part that is extended in a vertical direction from the protector horizontal part in at least a part of another end, opposite to the one end, of the protector horizontal part, and
    the flexible printed circuit including:
        a substrate horizontal part that is held by the protector horizontal part; and
        a bent part that is bent perpendicularly to the substrate horizontal part and held by the vertical part.

2. The connection module according to claim 1, wherein
    the insulating protector includes a plurality of unit protectors each provided to the corresponding one of the bus bars,
    the flexible printed circuit includes a plurality of unit substrates each provided to the corresponding one of the unit protectors, and
    at a position corresponding to a gap between two of the bus bars that are adjacent,
        a protector extra length part that is longer than the gap and couples two of the protector horizontal parts that are adjacent is formed between the protector horizontal parts of two of the unit protectors that are adjacent,
        a horizontal extra length part that is longer than the gap and couples two of the substrate horizontal parts that are adjacent is formed between the substrate horizontal parts of two of the unit substrates that are adjacent, and
        a vertical extra length part that is longer than the gap and couples the two bent parts that are adjacent is formed between bent parts of the two unit substrates that are adjacent.

3. The connection module according to claim 2, further comprising an opening formed between the horizontal extra length part and the vertical extra length part.

4. The connection module according to claim 1, wherein
    the insulating protector includes:

a first protector that is attached to one end part of an upper surface of the plurality of power storage elements in a direction perpendicular to a direction where the plurality of power storage elements are arranged; and a second protector that is attached to another end part, opposite to the one end part, of the upper surface of the plurality of power storage elements, the flexible printed circuit includes:

a first substrate that is held by the first protector;

a second substrate that is held by the second protector; and a substrate connection part that electrically connects the first substrate and the second substrate, the first protector and the second protector include, at one end part, a placement part that unifies the first protector and the second protector and that has the substrate connection part placed thereon, and the first protector and the second protector include, at another end part, a linking part that links the first protector and the second protector.

5. The connection module according to claim 4, wherein at least one of the first substrate and the second substrate is provided with an electronic component configured to process information regarding the power storage elements taken in through the bus bars.

6. The connection module according to claim 2, wherein the insulating protector includes:

a first protector that is attached to one end part of an upper surface of the plurality of power storage elements in a direction perpendicular to a direction where the plurality of power storage elements are arranged; and a second protector that is attached to another end part, opposite to the one end part, of the upper surface of the plurality of power storage elements, the flexible printed circuit includes:

a first substrate that is held by the first protector;

a second substrate that is held by the second protector; and a substrate connection part that electrically connects the first substrate and the second substrate, the first protector and the second protector include, at one end part, a placement part that unifies the first protector and the second protector and that has the substrate connection part placed thereon, and the first protector and the second protector include, at another end part, a linking part that links the first protector and the second protector.

7. The connection module according to claim 6, wherein at least one of the first substrate and the second substrate is provided with an electronic component configured to process information regarding the power storage elements taken in through the bus bars.

8. The connection module according to claim 3, wherein the insulating protector includes:

a first protector that is attached to one end part of an upper surface of the plurality of power storage elements in a direction perpendicular to a direction where the plurality of power storage elements are arranged; and a second protector that is attached to another end part, opposite to the one end part, of the upper surface of the plurality of power storage elements, the flexible printed circuit includes:

a first substrate that is held by the first protector;

a second substrate that is held by the second protector, and a substrate connection part that electrically connects the first substrate and the second substrate, the first protector and the second protector include, at one end part, a placement part that unifies the first protector and the second protector and that has the substrate connection part placed thereon, and the first protector and the second protector include, at another end part, a linking part that links the first protector and the second protector.

9. The connection module according to claim 8, wherein at least one of the first substrate and the second substrate is provided with an electronic component configured to process information regarding the power storage elements taken in through the bus bars.

* * * * *